Sept. 25, 1962

W. F. LUBER 3,056,067

POLYPHASE CIRCUIT BREAKER SYSTEM

Original Filed June 8, 1956

3 Sheets-Sheet 3

INVENTOR.
WILLIAM F. LUBER,
BY
McMorrow, Berman + Davidson
ATTORNEYS.

3,056,067
POLYPHASE CIRCUIT BREAKER SYSTEM
William F. Luber, Laurel, Md., assignor of two-fifths to Theodore L. Miazga, Hyattsville, Md.
Continuation of application Ser. No. 590,320, June 8, 1956. This application Feb. 5, 1960, Ser. No. 8,209
10 Claims. (Cl. 317—46)

This invention relates to protective means for polyphase alternating current circuits, and more particularly to a motor protective system responsive to phase failure in the alternating current circuits.

This is a continuation of my copending patent application filed June 8, 1956, having Serial No. 590,320, for a Three-Phase Circuit Breaker System, and now abandoned.

A main object of the invention is to provide a novel and improved motor protective system for use in polyphase motor installations, the improved protective system being arranged to disconnect the motors responsive to the failure of one of the phases of the power source, said improved protective system involving relatively simple components, being reliable in operation, and operating instantaneously responsive to a failure of a phase of an alternating supply source.

A further object of the invention is to provide an improved motor protective system for use in a three-phase motor installation of the type including a three-phase starter on each motor in the system, the improved protective device of the present invention being arranged to automatically disconnect the motors of the system responsive to the failure of one of the phases of the supply source, whereby the motors are protected against current overloading which would occur if the motors were to run on only two phases, and whereby the motors are protected against overheating under these conditions.

A still further object of the invention is to provide an improved protective system for a three-phase motor installation, said system operating to automatically disconnect the motors responsive to the failure of one of the phases of the supply source of the system, the improved protective device including time delay means for providing a time delay in the restoration of the connections of the motors to the supply lines after the three phases are again normal, thus providing all the controls of the circuit with sufficient time to properly condition themselves before the motors become energized.

Figure 1:
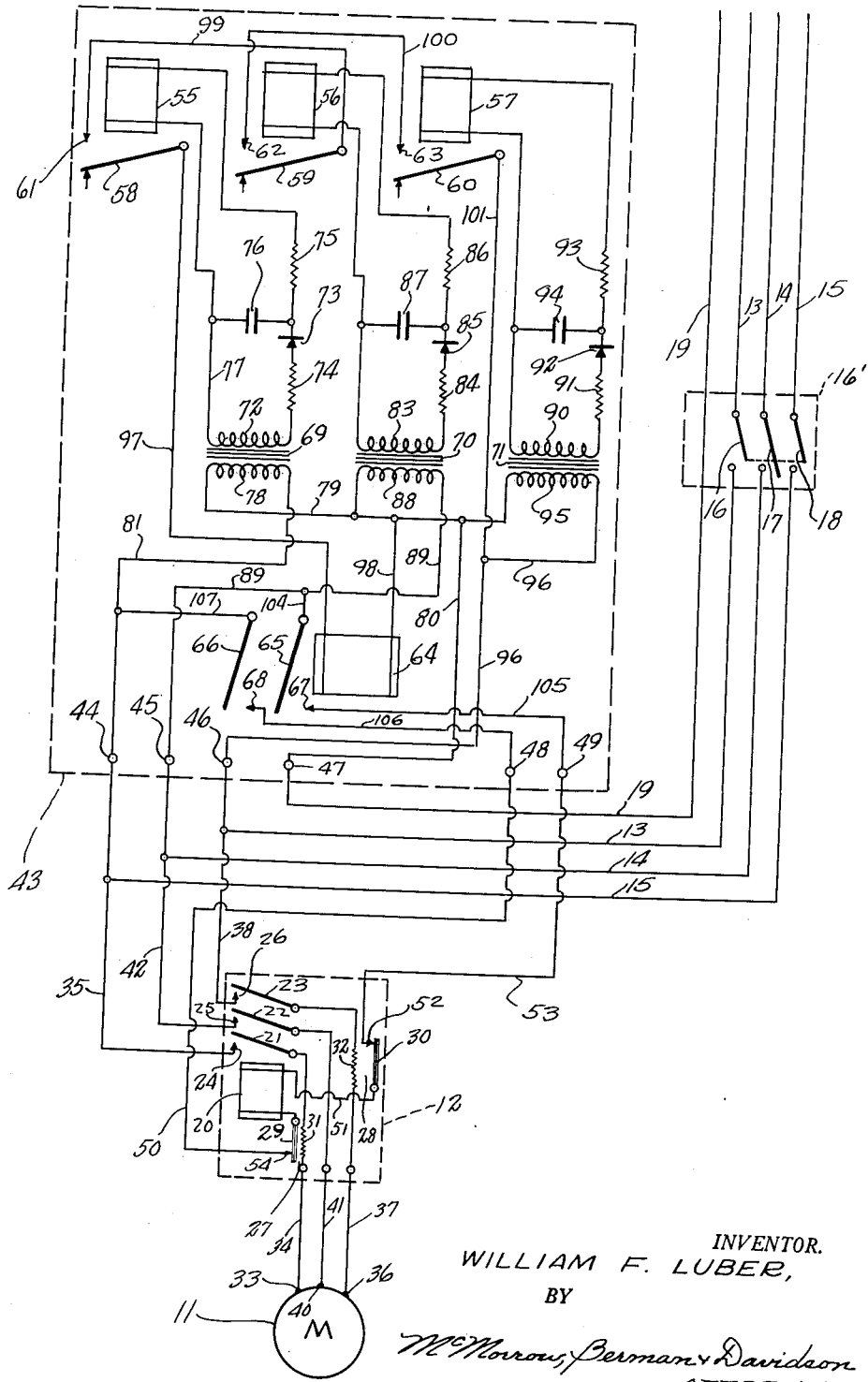
Figure 2:
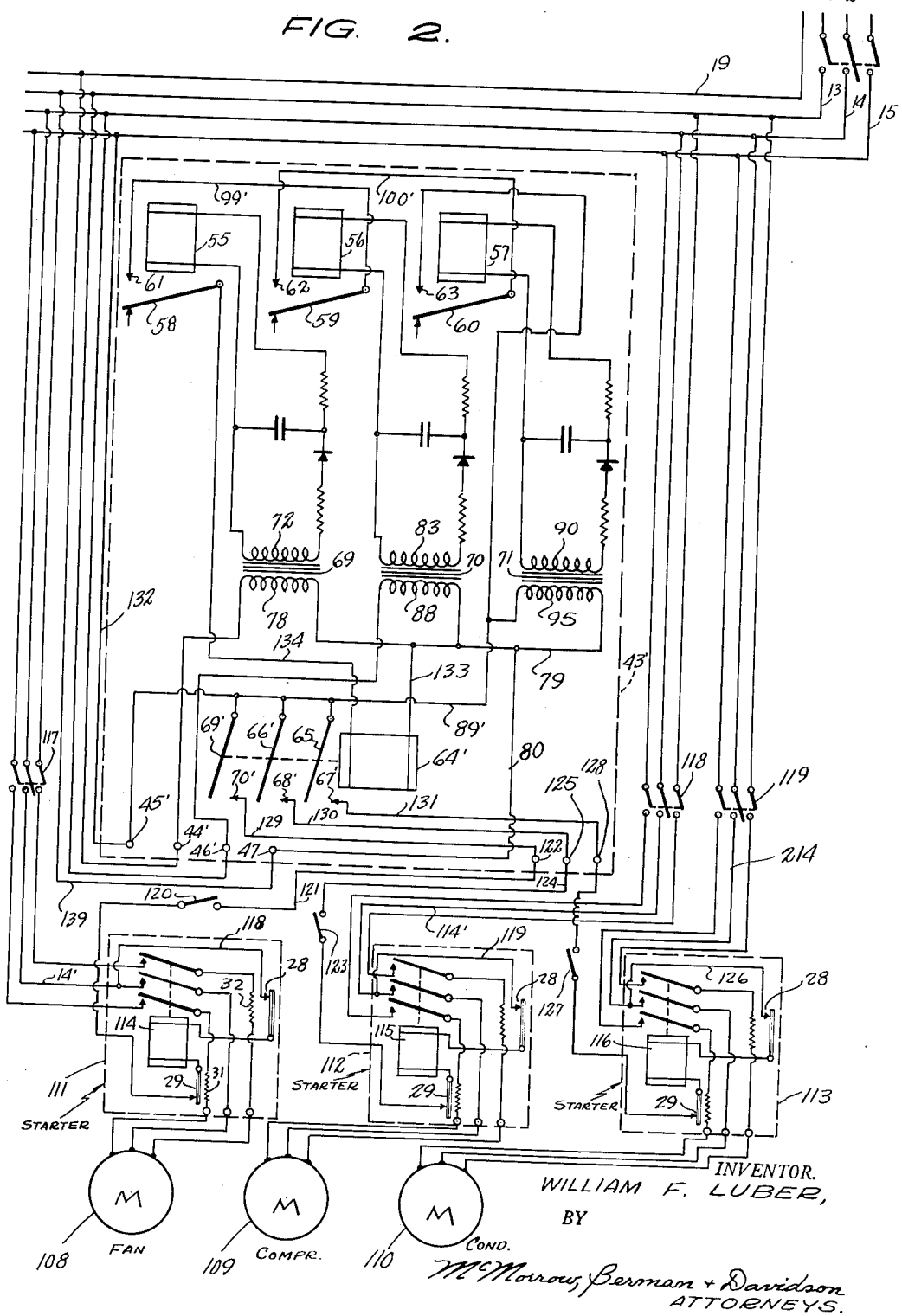
Figure 3:
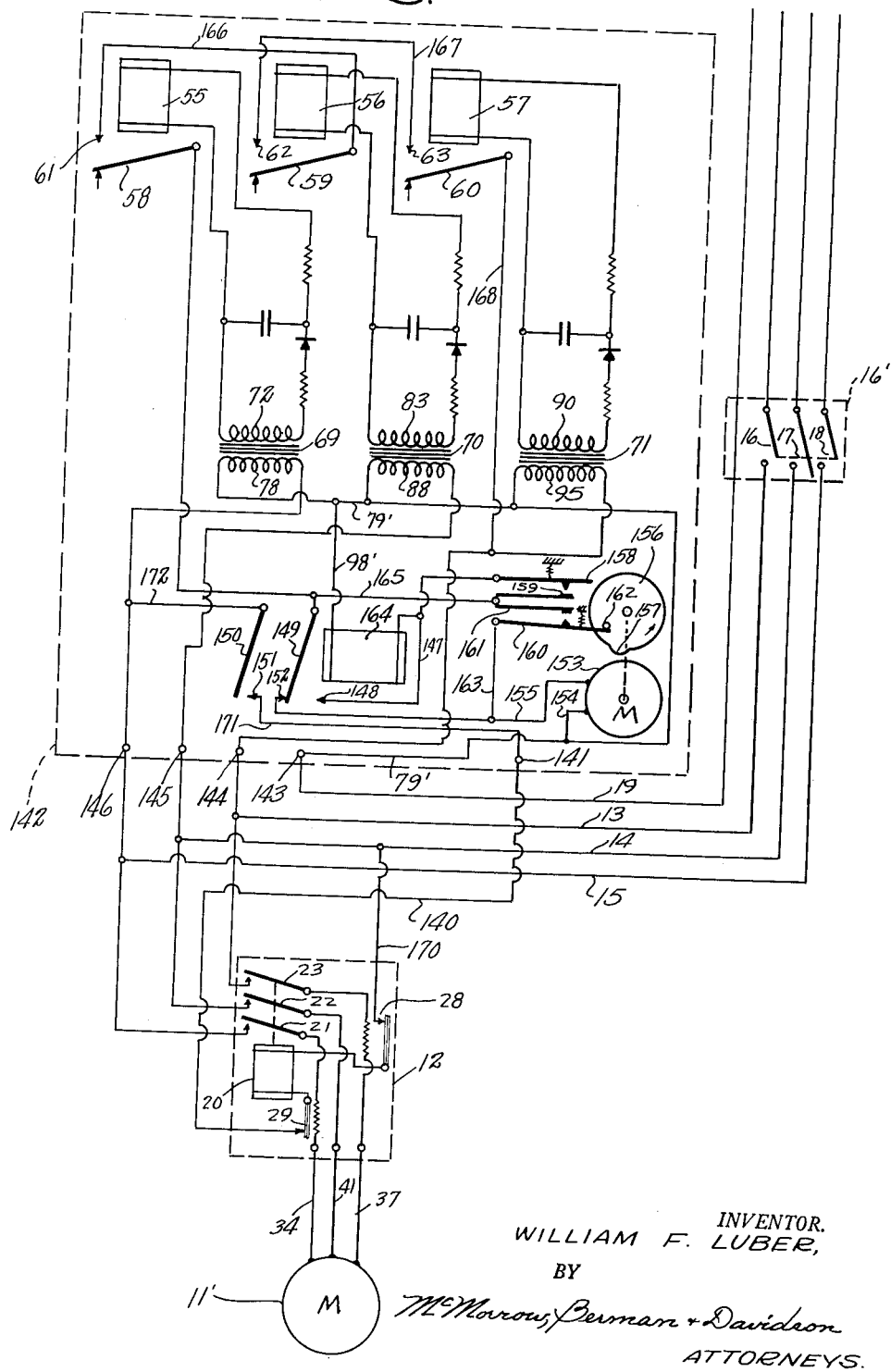

Further objects and advantages of the invention will become apparent from the following description and claims, and from the accompanying drawings, wherein:

FIGURE 1 is a schematic wiring diagram showing an improved phase failure motor protective system according to the present invention connected in circuit with a three phase motor and arranged to automatically disconnect the motor from its supply source responsive to the failure of one of the phases of said supply source;

FIGURE 2 is a schematic wiring diagram showing the electrical connections of the motors of a typical air conditioning system, the motors being provided with phase failure protective means according to the present invention to automatically disconnect the motors from the three-phase supply source thereof responsive to the failure of one of the phases of the source; and FIGURE 3 is a schematic wiring diagram of a three-phase motor provided with improved phase failure protective means according to the present invention for disconnecting the motor from the three-phase source responsive to the failure of one of the phases of the source, the circuit being provided with time delay means according to the present invention for providing a predetermined time delay in the reconnection of the motor to the source after the phases have again become normal, allowing the control elements in the circuit a proper amount of time to condition themselves before the motor becomes reenergized.

Referring to the drawings, and more particularly to FIGURE 1, thereof, there is shown a three-phase motor 11 which is connected through a conventional starter 12 to the respective three-phase supply lines 13, 14, 15 and 19. The supply lines are provided with a main control switch 16', including the respective ganged switches 16, 17 and 18 which are mechanically connected together for simultaneous manual operation, providing manual control of the three-phase supply to the motor 11.

As shown in FIGURE 1, the starter 12 comprises a solenoid 20 which controls three pivoted armatures 21, 22 and 23. The armatures engage the respective contacts 24, 25 and 26 connected in supply lines 13, 14 and 15 when solenoid 20 is energized, and disengage from said contacts when the solenoid becomes deenergized.

The starter 12 further includes the overload protective switch units 27 and 28, said switch units comprising heat-responsive flexible contact elements forming thermostatic switches 29 and 30 which are actuated by heating resistors 31 and 32. Heating resistor 31 is connected between a terminal 33 of the motor 11 and the armature 21 by a wire 34. The contact 24 operating with armature 21 is connected by a wire 35 to the supply line 15. Heating resistor 32 is connected between the armature 23 and a motor terminal 36 by a wire 37. The contact 26 operating with armature 23 is connected to the supply line 13 by a wire 38. The remaining terminal 40 of the motor 11 is connected to an armature 22 by a wire 41. The contact 25 operating with armature 22 is connected to the supply line 14 by a wire 42. Therefore, when solenoid 20 is energized, the motor 11 is connected to the respective supply lines 13, 14 and 15 through the armatures 21, 22 and 23 engaging their associated contacts 24, 25 and 26. Connected to armatures 21 and 23 are the heating windings 31 and 32 forming a series connection with the respective motor terminals 33 and 36.

As will be presently explained, the thermostatic switches 29 and 30 are connected to deenergize the solenoid 20 in response to abnormal heating currents in the resistors 31 and 32, and thus open the motor supply lines at the armatures 21, 22 and 23. The thermostatic switches provide substantial overload protection for the motor. However, in the event of the failure of one of the phases of the supply system, sufficient current may not flow in the resistors 31 or 32 or both to open the thermostatic switches 29 and 30, although the failure of one phase of supply polyphase system may cause the motor to run on two of the phases. Such an operation causes feedback current through the motor to produce excessive heating in the motor which may become sufficient to burn out the motor windings. Therefore, it is highly advantageous to automatically disconnect the motor 11 from the supply lines whenever one of the phases fails for any reason resulting from a blown fuse, transformer failure, or the like.

In further accordance with the present invention, a phase failure responsive device 43 is employed to control the solenoid 20 for affecting the operation of the starter 12. As shown, the phase failure responsive device 43 has terminals 44, 45, 46, 47, 48 and 49. The wire 35 is connected to the terminal 44, the wire 42 is connected to the terminal 45, and the wire 38 is connected to the terminal 46. The neutral line 19 is connected to the terminal 47. A stationary contact 54 of the thermostatic switch 29 is connected to the terminal 48 by a wire 50. The heat-responsive flexible contact element forming the thermostatic switch 29 is connected to one terminal of the winding forming the solenoid 20. The other terminal of the winding of solenoid 20 is connected by a wire 51 to the heat-responsive flexible contact element 30 forming the thermostatic switch 30. A stationary contact element 52 of said thermostatic switch 30 is connected by a wire 53 to the terminal 49.

The phase failure responsive device 43 is provided with three relays 55, 56 and 57, having the armatures 58, 59 and 60. When the windings of the three relays are energized, the armatures 58, 59 and 60 engage respective stationary contacts 61, 62 and 63. A further relay 64 provided in the phase failure responsive device is controlled by the relays 55, 56 and 57 in a manner presently to be described. The relay 64 is provided with a pair of armatures 65 and 66 which engage respective contacts 67 and 68 when the relay 64 is energized and which disengage from said contacts when said relay 64 is deenergized.

Supply transformers 69, 70 and 71 have secondaries 72, 83 and 90 that supply the energizing current for the respective relays 55, 56 and 57. As shown, the secondary 72 of the transformer 69 is connected to the winding of relay 55 through a rectifier 73 and resistors 74 and 75. A filter condenser 76 smoothes the rectified current delivered to the winding of the relay 55. Thus, resistor 74, rectifier 73, and resistor 75 are connected successively between one terminal of secondary 72 and one terminal of relay 55, and the remaining terminal of secondary 72 is connected to the remaining terminal of the relay 55 by a wire 77. One terminal of the filter condenser 76 is connected to the wire 77, and the other terminal of the filter condenser is connected to the junction between the output terminal of rectifier 73 and the resistor 75. One terminal of the primary winding 78 of the transformer 69 is connected to a wire 79 which is connected to the neutral terminal 47 by a wire 80. The remaining terminal of primary winding 78 is connected to the phase terminal 44 by a wire 81.

Similarly, the relay 56 is energized from the secondary 83 of transformer 70 through a resistor 84, a rectifier 85 and a resistor 86. A filter condenser 87 is employed to filter the rectified output delivered to relay 56 in the same manner as in the case of the output delivered to relay 55. The primary 88 of transformer 70 has one terminal thereof connected to the wire 79 and has the other terminal thereof connected to the phase terminal 45 by a wire 89. In a similar manner, the secondary 90 of the transformer 71 is connected to the winding of relay 57 through a resistor 91, a rectifier 92 and a resistor 93. A filter condenser 94 is provided to smooth the rectified output delivered to the winding of relay 57 in a manner identical to that described above in connection with the output delivered to relays 55 and 56. The primary 95 of transformer 71 has one terminal thereof connected to the neutral line wire 79 and has the other terminal thereof connected by a wire 96 to the phase terminal 46.

It will thus be apparent that each of the relays 55, 56 and 57 will be energized whenever the associated phases, connected respectively to the terminals 44, 45 and 46 are normal, namely, as long as normal voltage relationships exist between the respective phase supply lines 13, 14 and 15 and the neutral wire 47. Under these conditions, the respective armatures 58, 59 and 60 will engage the respective energized contacts 61, 62 and 63. Upon failure of any one of the phases, the associated armature 58, 59 or 60 disengages from its energized contact.

The winding of relay 64 has one terminal thereof connected by a wire 97 to the armature 58. The other terminal of the winding of relay 64 is connected by a wire 98 to the neutral wire 79, and is connected by the wire 80 to a neutral terminal 47 as above described. Contact 61 is connected by a wire 99 to the armature 59. Contact 62 is connected by a wire 100 to relay contact 63, and the armature 60 associated with contact 63 is connected by a wire 101 to the phase terminal 46 by the wire 96. It will thus be seen that relay 64 is normally energized from phase supply line 13 when all of the three relays 55, 56 and 57 are energized; this circuit comprises neutral wire 19, terminal 47, wire 80, wire 79, wire 90, the winding of relay 64, wire 97, armature 58, contact 61, wire 99, armature 59, contact 62, wire 100, contact 63, armature 60, wire 96, terminal 46 and phase supply line 13. Therefore, the armatures 65 and 66 will engage their associated contacts 67 and 68 and will energize the solenoid 20 of the starter 12 by a circuit comprising phase supply line 14, terminal 45, wire 89, a wire 104 connected between wire 89 and armature 65, contact 67, wire 105 connecting contact 67 to terminal 49, wire 53, contact 52 of the thermostatic switch 30, wire 51, the winding of solenoid 20, the thermostatic switch 29, contact 54, wire 50, terminal 48, a wire 106 connecting terminal 48 to contact 68, armature 66, a wire 107 connecting armature 66 to wire 81, terminal 44, wire 35, and phase supply line 15. Thus, solenoid 20 is normally connected between the phase supply lines 14 and 15, and continues so connected unless an overload occurs, causing either or both of thermostatic switches 29 and 30 to open, or the relay 64 becomes deenergized. As above explained, relay 64 has its winding connected in series with the respective contacts of relays 55, 56 and 57, which are in turn energized from the respective phases of the supply source. When any one of said phases fails, the associated relay 55, 56 or 57 becomes deenergized, causing its armature to disengage from its contact, whereby the circuit of the relay 64 is opened, causing relay 64 to be deenergized. When relay 64 is deenergized its armatures 65 and 66 disengage from the contacts 67 and 68 and open the circuit of the solenoid 20, causing the solenoid-controlled armatures 21, 22 and 23 to disengage from the contacts 24, 25 and 26, thereby deenergizing the motor 11.

When the normal conditions of the respective phase conductors 13, 14 and 15 have been restored, namely, when the cause of failure has been removed and normal voltage is again present between the respective supply lines 13, 14 and 15, and the neutral wire 19, the respective relays 55, 56 and 57 become reenergized and reestablish the energizing circuit for the relay 64. Relay 64 closes its contacts, reestablishing the energizing circuit for the solenoid 20, whereupon the armatures 21, 22 and 23 engage their respective contacts 24, 25 and 26, reenergizing the motor 11.

FIGURE 2 illustrates a typical multiple motor installation in a three-phase system wherein a phase failure responsive device according to the present invention is employed to control the respective starters of the motors in the system, such control being provided by a relay 64' having a plurality of armatures, each armature serving as a switch to control the energization of a respective starter solenoid. Thus, the system illustrated in FIGURE 2 may, for example, be an air conditioning system which employs a three-phase fan motor 108, a three-phase compressor motor 109 and a three-phase condenser motor 110. The respective motors 108, 109 and 110 are controlled by respective conventional starters 111, 112 and 113, each starter being identical with the starter 12 described in the embodiment of the invention illustrated in FIGURE 1. Thus, the starters 111, 112 and 113 are provided with the respective solenoids 114, 115 and 116, each solenoid having three armatures and contacts associated therewith, and each of the terminals of the motor associated therewith being connected to a respective supply line 13, 14 or 15 through one set of armatures and contacts and through the blades of a manually operated knife switch 117, 118 or 119, as shown. Heating resistors 31 and 32 are provided in two of the motor leads, as illustrated, said heating resistors acting on thermostatic switches 28 and 29 connected in the terminal leads of the respective solenoids 114, 115 and 116, as in the form of the invention shown in FIGURE 1. Thus, each of the motors 108, 109 and 110 is provided with conventional overload protection, comprising the thermostatic switches 28 and 29, operating to deenergize their associated solenoids 114, 115 and 116 responsive to overload current in the motors.

As shown, one terminal lead of solenoid 114 is connected through the thermostatic switch 28 and a wire 118 to a line connecting wire 14', which is connected through one of the sections of switch 117 to the supply line 14. The remaining terminal of solenoid 114 is connected through the thermostatic switch 29 and a manually controlled switch 120 to a wire 131 which is in turn connected to a terminal 122 of the phase failure-responsive control device 43'.

Similarly, the solenoid 115 of starter 112 and one terminal thereof connected through the thermostatic switch 28 thereof and a wire 119 to a conductor 114' which is connected through one of the sections of manual switch 118 to the supply line 14. The remaining terminal of solenoid 115 is connected through its associated thermostatic switch 29 and a manual switch 123 to a conductor 124 connected to a terminal 125 of device 43'.

In the same manner, the solenoid 116 of starter 113 has one terminal thereof connected through its associated thermostatic switch 28 and a conductor 126 to a line connecting wire 214, which is connected through a section of the manual switch 119 to the supply line 14. The remaining terminal of solenoid 116 is connected through its associated thermostatic switch 29 and a manual switch 127 to a terminal 128 of the device 43'.

Respective terminals 122, 125 and 128 are connected by respective conductors 129, 130 and 131 to the respective relay contacts 67', 68' and 70'. Each of the armatures 65', 66' and 69' is connected to a wire 89', which is connected to a terminal 45' of the device, said terminal being connected to one of the phase supply lines, as by wire 132 which connects the terminal 45' to the supply line 15. Thus, with relay 64' energized, the respective solenoids 114, 115 and 116 will be energized under normal conditions, because they are connected between the supply lines 15 and 14 as long as the armatures 65', 66' and 69' engage their respective contacts 67', 68' and 70'.

The respective relays 55, 56 and 57 are normally energized in the same manner as described in connection with the preceding form of the invention, said relays being energized from the respective phase conductors supply lines 13, 14 and 15 through respective transformers 69, 70 and 71 and rectifying circuits connected between the relays and the secondaries of the transformers. The primaries of the transformers are connected between the respective phase conductors and the neutral conductor 19, each primary having one terminal thereof connected to the neutral terminal 47 of the device through the wires 79 and 80, and the respective remaining terminals of the primaries being connected to the respective phase terminals 44', 45' and 46', as shown.

Relay 64' has one terminal thereof connected to the neutral wire 79, as by a wire 133. The other terminal of the relay 64' is connected by a wire 134 to the armature 58 of relay 55. Contact 61 is connected by a wire 99' to armature 59 and contact 62 is connected by a wire 100' to armature 60. Contact 63 is connected to the wire 89'. Thus, solenoid 64' is connected between the neutral wire 79 (connected to the neutral line 19) and the phase wire 89' (connected to the phase conductor supply line 15) through the series-connected pairs of contacts 61—58, 62—69, and 63—60. Thus the circuit for relay 64' can be traced from neutral line 19 through a conductor 139 connecting said neutral line to terminal 47, wire 80, wire 79, wire 133, the winding of the relay 64', wire 134, armature 58, contact 61, wire 99', armature 59, contact 62, wire 100', armature 60, contact 63, wire 89', terminal 45', wire 132 and supply line 15. As in the previously described form of the invention, when any of the phases fails, one of the relays 55, 56 and 57 becomes deenergized, opening the circuit of the relay 64', and causing its armatures 65', 66' and 69' to disengage from their contacts 67', 68' and 70', thereby deenergizing all of the solenoids 114, 115 and 116, and thus deenergizing the motors 108, 109 and 110 simultaneously. Upon resumption of normal phase conditions, that is, normal voltage between respective phase conductor supply lines 13, 14 and 15 and the neutral line 19, the relays 55, 56 and 57 become energized, closing their contacts and reestablishing the energizing circuit for the relay 64', which causes its armatures 65', 66' and 69' to engage their contacts and to reenergize the solenoids 114, 115 and 116. This closes the breaker contacts of the starters 111, 112 and 113, and reenergizes the motors 108, 109 and 110.

In the form of the invention shown in FIGURE 3, means is provided in the device for introducing a specified time delay after all phases become normal for the reenergization of the motor 11'. In this embodiment of the invention, the starter 12 is similar to the starters in the form of the invention shown in FIGURE 1 and includes the solenoid 20 which controls the circuit breaker armatures 21, 22 and 23 which are respectively connected between the terminal wire of motor 11' and the respective three-phase supply lines 13, 14 and 15. The solenoid 20 has one terminal thereof connected through the thermostatic switch 28 to the supply line 14. The other terminal of the solenoid is connected through the thermostatic switch 29 and a wire 140 to a terminal 141 of the protective device 142. The device 142 has the respective additional terminals 143, 144, 145 and 146. The neutral line 19 is connected to the terminal 143. The supply line 13 is connected to the terminal 144. the supply line 14 is connected to the terminal 145 and the supply line 15 is connected to the terminal 146.

The device 142 includes the relays 55, 56 and 57, as in the forms of the invention previously described, said relays being energized from the secondaries 72, 83 and 90 of respective transformers 69, 70 and 71, by means of rectifying and filtering circuits, as previously described for similar elements in FIGURE 1. The primaries 78, 88 and 95 of the transformers 69, 70 and 71 are respectively energized from the respective phases 13, 14 and 15 by the voltages appearing between the phase conductor supply lines 13, 14 and 15, and the neutral line 19. An additional relay 164 is provided in the device 142, one terminal of the relay 164 being connected by a wire 98' to a neutral wire 79', connected to the neutral terminal 143. The remaining terminal of relay 164 is connected to a wire 147, which is in turn connected to a contact 148 of relay 164. Relay 164 has the armatures 149 and 150 and has contact 148 and 151 respectively engaged by armatures 149 and 150 when relay 164 is energized. The relay has an additional contact 152 which is engaged by armature 149 when the relay is deenergized.

A timing motor 153 mounted in the device has one terminal thereof connected by a wire 154 to terminal 143 through wire 79'. The other terminal of the timing motor 153 is connected by a wire 155 to contact 152. Mechanically coupled to the shaft of the timing motor 153 is a cam disc 156 which rotates counterclockwise, as viewed in FIGURE 3, responsive to energization of motor 153, the cam disc 156 being provided with a peripheral projection 157 which is at times engageable with a flexible switch arm 158 mounted adjacent the disc and being located so as to conductively engage a stationary contact 159 responsive to the abutment of the projection 157 therewith when disc 156 rotates counterclockwise from the position thereof as shown in FIGURE 3. A further movable contact arm 160 is provided, said contact arm being pivoted adjacent the disc 156 and being biased by a suitable spring means into normal engagement with a stationary contact arm 161. A laterally projecting pin 162 on the disc 156 is engageable with the pivoted arm 160 to move arm 160 out of contact with respect to member 161 as the disc 156 rotates counterclockwise, the engagement of pin 162 with arm 160 occurring a short time after the projection 157 engages contact arm 158 to close contacts 158 and 159.

As shown, contact arm 160 is connected to wire 155 by a wire 163. Stationary contact elements 159 and 161 are connected together to a common conductor 165, which is connected to the armature 58 of relay 55. Armature 149 is connected to the wire 165. Wire 147 is connected to the movable switch arm 158. Relay contact 61 is connected to armature 59 by a wire 166. Contact 62 is connected to contact 63 by a wire 167. Armature 60 is connected to terminal 144 by a wire 168.

Under normal conditions, namely, with normal voltages existing between the phase supply lines 13, 14 and 15 and the neutral wire 19, the relays 55, 56 and 57 will be energized, and the relay 164 will be also energized by a circuit as follows: Neutral wire terminal 143, wire 79′, wire 98′, the winding of relay 164, wire 147, armature 149, (armature 149 normally engages contact 148) wire 165, armature 58, contact 61, wire 166, armature 59, contact 62, wire 167, contact 63, armature 60, wire 168, terminal 144 and supply line 13. Solenoid 20 is thus normally energized by a circuit comprising supply line 14, a wire 170, thermostatic switch 28, the winding of solenoid 20, thermostatic switch 29, wire 140, terminal 141, a wire 171 connecting terminal 141 to contact 151, armature 150, a wire 172 connecting armature 150 to terminal 146, and the supply line 15.

When a failure occurs in one of the phases, resulting in the dropping of the voltage between one of the phase supply lines and the neutral line below a minimum value, the associated relay 55, 56 or 57 becomes deenergized, opening the circuit of the relay 164. The relay 164 releases its armatures 149 and 150, causing the solenoid 20 to become deenergized by the opening of its circuit at the contacts 150, 151. This opens the circuit breaker contacts 21, 22 and 23 connecting the motor 11′, deenergizing the motor. When normal phase conditions are reestablished, the relays 55, 56 and 57 all become energized, raising their armatures. Since it is necessary for armature 149 to engage contact 148 to energize the relay 164, said relay cannot immediately become energized. However, an energizing circuit is closed for the timing motor 153 as follows: Neutral line 19, terminal 143, wire 154, the winding of motor 153, wire 155, contact 152, armature 149, wire 165, armature 58, contact 61, wire 166, armature 59, contact 62, wire 167, contact 63, armature 60, wire 168, terminal 144 and supply line 13. When timing motor 153 becomes energized, pin 162 is initially in a position shown in FIGURE 3. As soon as the motor 153 begins to rotate, pin 162 slips past member 160, releasing said member, and allowing said member 160 to engage stationary contact element 161. This establishes a shunt across the contacts 149, 152 of relay 164, maintaining the energizing circuit for motor 153 intact after armature 149 disengages from contact 152, as will be presently described.

Relay 164 remains deenergized for a short period, namely, the period of time required for projection 157 to rotate into engagement with the flexible switch member 158. When this occurs, member 158 engages contact 159, causing the relay 164 to become energized by a circuit comprising neutral line 19, terminal 143, wire 79′, wire 98′, the winding of relay 164, wire 147, contact member 158, contact member 159, wire 165, armature 58, contact 61, wire 166, armature 59, contact 62, wire 167, contact 63, armature 60, wire 168, terminal 144, and supply line 13. Armatures 149 and 150 therefore swing into engagement with contacts 148 and 151. As above explained, the motor 153 remains energized, allowing disc member 156 to continue its rotation until pin 162 engages the member 160, at which time contacts 160—161 open, deenergizing motor 153. Relay 164 is maintained energized at this time because armature 149 engages contact 148, whereby the normal energizing circuit, above described, for relay 164 is established.

When armature 150 engages contact 151, the solenoid 20 is energized, closing its circuit breaker contacts 21, 22 and 23, and reenergizing the motor 11′. However, this occurs a specified time after the energization of relays 55, 56 and 57, as above explained, for example, 30 seconds after the reestablishment of normal phase conditions, which provides a sufficient time for all the controls in the motor circuit to condition themselves properly before the motor 11′ is restarted.

Obviously, the time delay arrangement illustrated in FIGURE 3 may be employed in multiple motor installations, such as in the system shown in FIGURE 2, to provide a time delay between the reestablishment of normal phase conditions and the restarting of the motors of the system, for the purpose of providing sufficient time for the controls associated with the system to condition themselves properly prior to the restarting of the motors of said systems. Furthermore, the arrangement disclosed is such that any type of three-phase or phase motor may be employed, the motor and the supply lines not necessarily being of the four-wire type as shown.

While certain specific embodiments of an improved phase failure protective device for a polyphase motor system have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a polyphase electrical system including a plurality of phase line conductors, a neutral line conductor, a polyphase motor, and a polyphase circuit breaker having respective switch elements connected between the respective motor terminals and the respective phase line conductors and common solenoid means controlling said switch elements and connected to certain of said phase line conductors, respective relays associated with the respective phase line conductors, circuit means formed and arranged to energize each relay from the voltage between a respective phase line conductor and said neutral line conductor, an additional relay controlling said common solenoid means when energized, said additional relay being provided with first contact means closing in response to deenergization of said additional relay and second contact means closing in response to energization of said additional relay, an energizing circuit including said second contact means and the contacts of said first-named relays connected to the winding of said additional relay, a time delay switch device, and an energizing circuit connected to said time delay switch device and including said first contact means and the contacts of said first-named relays, whereby to initiate operation of said time delay switch device in response to the deenergization of said additional relay and the simultaneous energization of all of said first-named relays, said time delay switch device having a pair of contacts connected in parallel with said second contact means which close after a predetermined period of operation of said time delay switch device, whereby to restore control of said additional relay over said common solenoid means a predetermined period of time after all of said first-named relays again become energized subsequent to the deenergization of any of said first-named relays.

2. In a polyphase electrical system including a plurality of phase line conductors, a neutral line conductor, a polyphase motor, and a polyphase circuit breaker having respective switch elements connected between the respective motor terminals and the respective phase line conductors and common solenoid means controlling said switch elements and connected to certain of said phase line conductors, respective relays associated with the respective phase line conductors, circuit means formed and arranged to energize each relay from the voltage between a respective phase line conductor and said neutral line conductor, an additional relay controlling said common solenoid means when energized, said additional relay being provided with first contact means closing in response to deenergization of said additional relay and second contact means closing in response to energization of said additional relay, an energizing circuit including said second contact means and the contacts of said first-named relays connected to the winding of said additional relay, a time delay switch device, an energizing circuit connected to said time delay switch device and including said first contact means and the contacts of said first-named relays, whereby to initiate operation of said time delay switch device in response to the deenergization of said additional relay and the simultaneous energization of all of said first-named relays, said time delay switch device having a pair of contacts connected in parallel with said second contact means which close after a predetermined period of operaton of said time delay switch device, whereby to restore control of said additional relay over said common solenoid means a predetermined period of time after all of said first-named relays again become energized subsequent to the deenergization of any of said first-named relays, and means to open said last-named energizing circuit and terminate operation of said time delay switch device a relatively short period of time subsequent to the energization of said additional relay.

3. In a polyphase electrical system including a plurality of phase line conductors, a neutral line conductor, a polyphase motor, and a polyphase circuit breaker having respective switch elements connected between the respective motor terminals and the respective phase line conductors and common solenoid means controlling said switch elements and connected to certain of said phase line conductors, respective relays associated with the respective phase line conductors, circuit means formed and arranged to energize each relay from the voltage between a respective phase line conductor and said neutral line conductor, an additional relay controlling said common solenoid means when energized, said additional relay having a pair of contacts closed when said additional relay is energized, an energizing circuit including the contacts of said first-named relays connected to the winding of said additional relay through said pair of contacts, a time delay switch device, and means to at times initiate operation of said time delay switch device in response to the deenergization of said additional relay and the simultaneous energization of all of said first-named relays, said time delay switch device having a pair of contacts which close after a predetermined period of operation of said time delay switch device, said last-named pair of contacts being connected in parallel with the first-named pair of contacts, whereby to energize said additional relay and restore control thereof over said common solenoid means a predetermined period of time after all of said first-named relays again become energized subsequent to the deenergization of any of said first-named relays.

4. In a polyphase electrical system including a plurality of phase line conductors, a neutral line conductor, a polyphase motor, and a polyphase circuit breaker having respective switch elements connected between the respective motor terminals and the respective phase line conductors, and common solenoid means controlling said switch elements and connected to certain of said phase line conductors, respective relays associated with the respective phase line conductors, circuit means formed and arranged to energize each relay from the voltage between a respective phase line conductor and said neutral line conductor, a control relay having a first armature and a first contact engaged by said first armature when the control relay is energized, said armature and contact being connected in circuit with said common solenoid means, and a second armature and second and third contacts engageable by said second armature, the second armature engaging the second contact when the control relay is deenergized and engaging the third contact when the control relay is energized, circuit means including said second armature and third contact connecting the winding of said control relay in series with the contacts of said first-named relay between said neutral line conductor and one of said phase line conductors, whereby said control relay will become deenergized to deenergize said common solenoid means either when the voltage of said one line conductor drops below a predetermined value with respect to said neutral line conductor or when the voltage of any of the other phase conductors drops below a predetermined value with respect to the neutral line conductor, a time delay switch device, and an energizing circuit including said second armature and second contact constructed and arranged to initiate operation of said time delay switch device in response to the deenergization of said control relay and the simultaneous energization of all of said first-named relays, said time delay switch device being provided with a pair of contacts which close after a predetermined period of operation of said time delay switch device, said last-named pair of contacts being connected in parallel with said second armature and third contact, whereby to energize said control relay and the common solenoid means a predetermined period of time after said first-named relays again become energized subsequent to the deenergization of any of said first-named relays.

5. In a polyphase electrical system including a plurality of phase line conductors, a polyphase motor, a polyphase circuit breaker having respective switch elements connected between the respective motor terminals and the respective phase line conductors and common solenoid means controlling said switch elements and connected to at least two of said phase line conductors, respective relays operatively connected with the respective phase line conductors, circuit means connecting each relay between a respective phase line conductor and said neutral line conductor, a control relay having contacts connected in circuit with said common solenoid means, circuit means connecting the winding of said control relay in series with the contacts of said first-named relays to one of said phase line conductors whereby said control relay will become deenergized to deenergize said common solenoid means either when the voltage of said one phase line conductor drops below a predetermined value or when the voltage of any of the other phase line conductors drops below a predetermined value, and time delay switch device in circuit with the winding of said control relay and controlled by said first-named relays, said time delay switch device being actuated to energize said control relay and the common solenoid means at a predetermined period of time after said first-named relays again become energized subsequent to the deenergization of any of said first-named relays.

6. A polyphase electrical system comprising a plurality of phase line conductors, a polyphase motor, and a polyphase circuit breaker having respective switch elements connected between the respective motor terminals and the respective phase line conductors and including means connected to at least one of said phase line conductors for controlling said switch elements, respective relays associated with the respective phase line conductors, circuit means energizing each relay from the voltage on a respective phase line conductor, an additional relay controlling said common solenoid means when energized, said additional relay being provided with first contact means closing in response to deenergization of said additional relay and second contact means closing in response to energization of said additional relay, an energizing circuit including said second contact means and the contacts of said first-named relays connected to the winding of said additional relay, a time delay switch device, and an energizing circuit connected to said time delay switch device and including said first contact means and the contacts of said first-named relays for initiating operation of said time delay switch device in response to the deenergization of said additional relay and the simultaneous energization of all of said first-named relays, said time delay switch device having a pair of contacts connected in parallel with said second contact means which close after a predetermined period of operation of said time delay switch device that restores control of said additional relay over said controlling means a predetermined period of time after all of said first-named relays again become energized subsequent to the deenergization of any of said first-named relays.

7. A polyphase electrical system comprising a plurality of phase line conductors, a polyphase motor, and a polyphase circuit breaker having respective switch elements connected between the respective motor terminals and the respective phase line conductors and including common solenoid means connected to at least one of said phase line conductors for controlling said switch elements, respective relays associated with the respective phase line conductors, circuit means energizing each relay from a voltage on a respective phase line conductor, an additional relay controlling said common solenoid means when energized, said additional relay being provided with first contact means closing in response to deenergization of said additional relay and second contact means closing in response to energization of said additional relay, an energizing circuit including said second contact means and the contacts of said first-named relays connected to the winding of said additional relay, a time delay switch device, an energizing circuit connected to said time delay switch device and including said first contact means and the contacts of said first-named relays, whereby to initiate operation of said time delay switch device in response to the deenergization of said additional relay and the simultaneous energization of all of said first-named relays, said time delay switch device having a pair of contacts connected in parallel with said second contact means which close after a predetermined period of operation of said time delay switch device, whereby to restore control of said additional relay over said common solenoid means a predetermined period of time after all of said first-named relays again become energized subsequent to the deenergization of any of said first-named relays, and means to open said last-named energizing circuit and terminate operation of said time delay switch device a relatively short period of time subsequent to the energization of said additional relay.

8. A polyphase electrical system comprising a plurality of phase line conductors, a polyphase motor, and a polyphase circuit breaker having respective switch elements connected between the respective motor terminals and the respective phase line conductors, and common solenoid means connected to at least one of said phase line conductors for controlling said switch elements, respective relays associated with the respective phase line conductors, circuit means energizing each relay from a voltage with respect to a phase line conductor, an additional relay controlling said common solenoid means when energized, said additional relay having a pair of contacts closed when said additional relay is energized, an energizing circuit including the contacts of said first-named relays connected to the winding of said additional relay through said pair of contacts, a time delay switch device, and means to at times initiate operation of said time delay switch device in response to the deenergization of said additional relay and the simultaneous energization of all of said first-named relays, said time delay switch device having a pair of contacts which close after a predetermined period of operation of said time delay switch device, said last-named pair of contacts being connected in parallel with the first-named pair of contacts for energizing said additional relay and restoring control thereof over said common solenoid means at a predetermined period of time after all of said first-named relays again become energized subsequent to the deenergization of any of said first-named relays.

9. A polyphase electrical system comprising a plurality of phase line conductors, a polyphase motor, and a polyphase circuit breaker having respective switch elements connected between the respective motor terminals and the respective phase line conductors, and common solenoid means connected to at least one of said phase line conductors for controlling said switch elements, respective ductors for controlling said switch elements, respective relays associated with the respective phase line conductors, circuit means energizing each relay from a voltage with respect to a phase line conductor, a control relay having a first armature and a first contact engaged by said first armature when the control relay is energized, said armature and contact being connected in circuit with said common solenoid means, and a second armature and second and third contacts engageable by said second armature, the second armature engaging the second contact when the control relay is deenergized and engaging the third contact when the control relay is energized, circuit means including said second armature and third contact connecting the winding of said control relay in series with the contacts of said first-named relay with one of said phase line conductors, whereby said control relay will become deenergized to deenergize said common solenoid means either when the voltage of said one line conductor drops below a predetermined value, a time delay switch device, and an energizing circuit including said second armature and second contact constructed and arranged to initiate operation of said time delay switch device in response to the deenergization of said control relay and the simultaneous energization of all of said first-named relays, said time delay switch device being provided with a pair of contacts which close after a predetermined period of operation of said time delay switch device, said last-named pair of contacts being connected in parallel with said second armature and third contact to energize said control relay and the common solenoid means a predetermined period of time after said first-named relays again become energized subsequent to the deenergization of any of said first-named relays.

10. A polyphase electrical system comprising a plurality of phase line conductors, a polyphase circuit breaker having respective switch elements connected between the respective motor terminals and the respective phase line conductors and common solenoid means connected to at least one of said phase line conductors for controlling said switch elements, respective relays operatively connected with the respective phase line conductors, circuit means connecting each relay with a respective phase line conductor, a control relay having contacts connected in circuit with said common solenoid means, circuit means connecting the winding of said control relay in series with the contacts of said first-named relays to one of said phase line conductors whereby said control relay will become deenergized to deenergize said common solenoid means when the voltage of one phase line conductor drops below a predetermined value, and a time delay switch device in circuit with the winding of said control relay and controlled by said-named relays, said time delay switch device being actuated to energize said control relay and the common solenoid means at a predetermined period of time after said first-named relays again become energized subsequent to the deenergization of any of said first-named relays.

References Cited in the file of this patent

UNITED STATES PATENTS

| | | |
|---|---|---|
| 1,179,637 | Kruse | Apr. 18, 1916 |
| 1,314,332 | Jones | Aug. 26, 1919 |

(Other references on following page)

UNITED STATES PATENTS

| | | |
|---|---|---|
| 1,453,492 | Connely | May 1, 1923 |
| 1,786,326 | Anderson | Dec. 23, 1930 |
| 1,809,827 | Bower | June 16, 1931 |
| 2,280,945 | Gamel | Apr. 28, 1942 |
| 2,292,935 | Gay | Aug. 11, 1942 |
| 2,304,865 | Thumim | Dec. 15, 1942 |
| 2,349,647 | Boisseau | May 23, 1944 |
| 2,607,831 | Jones | Aug. 19, 1952 |
| 2,864,049 | Sheets | Dec. 9, 1958 |
| 2,930,938 | Tapper | Mar. 29, 1960 |

FOREIGN PATENTS

| | | |
|---|---|---|
| 455,751 | Germany | Nov. 17, 1925 |